United States Patent Office 3,746,670
Patented July 17, 1973

3,746,670
AUTOMOBILE POLYESTER BODY FILLER
Harold P. McGuire, 5636 S. Hoyne St.,
Chicago, Ill. 60636
No Drawing. Filed May 13, 1971, Ser. No. 143,253
Int. Cl. C08g 39/10
U.S. Cl. 260—7.5                          3 Claims

ABSTRACT OF THE DISCLOSURE

A composition comprising a liquid component including a polyester resin and an accelerator and a dry filler component consisting essentially of a uniform mixture of asbestos fibers, metallic powder and soybean meal, the soybean meal functioning as an adhesive agent to bond the components together and thereby enhance workability while minimizing dusting of the compound during working thereof.

BACKGROUND OF THE INVENTION

This invention relates to a molding compound, and more particularly to a molding compound which simulates metal when set. More particularly, this invention relates to an improved molding compound which simulates metal and can be utilized to repair metallic surfaces of automobile bodies, household appliances or the like which have dents, cracks, or holes.

In the past, it has been known to utilize lead solders to fill dents, cracks or holes in the metallic surface to be repaired or to be finished and then to grind and otherwise work such surfaces smooth so that they may be finished by paint or a like protective coating. The use of lead solders in automotive use involves a health hazard due to the toxicity of the lead.

Subsequently, it was suggested that the use of lead be obviated and that a solder be provided which consisted of a homogeneous mixture of a thermoplastic polyurethane plastic which was the reaction product of an organic diisocyanate and a polyester derived from a dibasic aliphatic acid and an alkyl glycol, a thermoplastic polyamide resin which is a condensation product of a polyamine and a dibasic acid obtained by polymerizing unsaturated fatty acids, and a finely divided filler.

Though this soldering composition which is the type disclosed in Balk Pat. 3,249,563, is generally satisfactory, it has shortcomings in terms of its workability and smoothness of surface during such workability.

Another example of known molding composition of the type used to simulate metal and to fill cracks or the like in metallic surfaces is found in Gorick Pat. 3,255,029. The composition disclosed therein includes a liquid component comprised of a polyester resin with an accelerator and the dry component comprising metal in a particulate form in a catalyst. The patent suggests that powdered mica and asbestos fibers may be incorporated into the dry component for dimensional stability. A compound of the type described in the Gorick patent tends to dust during use and this has been found to be objectionable.

An object of the present invention is to provide an improved molding composition for use in repairing metal surfaces which is long-lasting, has good adhesion to the metal surface and resistance to impact over a wide temperature range and which is easily worked so as to provide a finely finished smooth surface with a minimum of dusting.

Another object of the present invention is to provide an improved molding compound which incorporates polyester resin, an accelerator, asbestos fibers, soybean meal, and metallic powder, which molding compound is readily worked with a minimization of the dusting during working thereof.

Other objects and advantages of the present invention will become more apparent hereinafter.

DETAILED DESCRIPTION OF THE PRESENT INVENTION

The present invention consists of a molding compound which is formed basically from a liquid component and a dry filler component.

A presently preferred liquid component comprises polyester resin and a cobalt naphthanate accelerator blended in the ratio of 3:1 by weight. Desirably, the cobalt type accelerator is cobalt octoate.

The dry filler component preferably comprises asbestos fibers, a proteinaceous meal, as for example soybean meal, and magnesium powder. Though magnesium-meg. 40 is the preferred metallic powder, it is recognized that other metallic powders of good workability may be substituted as, for example, bronze, copper, steel or brass powder.

PREPARATION OF COMPOUND

To repair a dent, hole, rusted-out portion or the like of an automobile body, automobile fender or the like metallic surface to be repaired, the dry and liquid components which are separately packaged are blended together in situ. Several modes of blending the components may be utilized. Alternate forms which have been successfully utilized will be described hereafter.

A presently preferred formulation comprises the following constituents by weight:

| | Percent |
|---|---|
| Polyester resin | 30 |
| Cobalt naphthanate | 10 |
| Fine asbestos fibers, powder form | 25 |
| Soybean meal powder | 25 |
| Magnesium (40 mesh) | 10 |

The soybean meal, preferably in powdered form, asbestos fibers, also preferably in powdered form, and magnesium, also in powdered form (preferably about 40 mesh) are placed in a mixer and mixed well for approximately one hour. The polyester resin and the cobalt naphthanate are then added to the mixer and the blending continues for an additional one and one-half hours. The mixing may be conducted at normal room temperature.

Then a catalyst, such as methyl ethyl ketone (MEK), is added to accelerate the hardening or setting up of the blended constituents. The amount of catalyst used depends upon the bulk of the material to be mixed at a given time. Preferably, for each 12 lbs. of formula, I use three ounces of the catalyst. In mixing several batches, I have found that the percent of catalyst in the total formula, by weight, is in the range of about 1½%–2%.

Another mode of blending the constituents of the liquid component and dry filler component of the molding composition is to mix the polyester resin and cobalt naphthanate for about 10 to 20 minutes to effect a heating thereof. Then I add in sequence the magnesium, the soybean meal and asbestos fibers. The blending of the magnesium continues for about 30 minutes. The blending of the soybean meal to the other constituents continues for an additional 30 minutes and then the asbestos fibers are blended, for an additional hour, with the foregoing components.

The principal function of the molding composition of this invention is for application to torn, dented or perforated sections of automobiles, boats, boilers, or the like, so as to fill such tears, dents and performations and achieve a smooth surface. It is intended to have the molding composition expand and contract with the surface to which it is applied after the molding composition has hardened. Furthermore, it is intended that the surface be sanded, smoothed and refinished to blend smoothly with the surface around the damaged portion. A molding composition formed in accordance with the preferred invention does in fact perform the desired results with a minimum of dusting. This is most advantageous, particularly where the safety and health of the workers are concerned.

I have performed several tests in order to determine the range of constituent products and what products might be substituted for constituents of the molding composition.

For comparison purposes, I have prepared a formulation of a molding composition identical with the preferred composition set forth above, except that for the 25% soybean meal, a talc was substituted. This composition blended fairly well; however, when applied to a surface, it was found that the talc readily powdered out or dusted out, thus causing undesirable streaks in the work surface, which did not produce a finely finished smooth end surface. In addition, there was a high degree of dusting as compared with the use of a molding composition having the soybean meal, as in my invention, rather than talc.

The preferred molding composition of the present invention is readily expandable and contractable to conform to the metal surface to which it is applied. It can be applied easily to provide a smooth surface that will then be readily finished by painting. In addition, the surface is long-lasting and will not deteriorate under weathering or extended use.

The percentages of constituents are not to be materially varied, as the end results might be adversely affected. For example, if materially more metal powder is used, then the molding composition becomes hard to file, sand, etc. One successful modification has a formula as follows:

|  | Percent |
|---|---|
| Polyester resin | 30 |
| Cobalt naphthanate | 10 |
| Soybean meal | 35 |
| Asbestos fibers | 15 |
| Magnesium | 10 |

This molding composition was harder to file, but it produced a smooth finish and appeared to have the long-lasting characteristics of the preferred embodiment of the invention. Thus, it appears that the soybean meal may be varied from between 25%–35% by way of the composition with comparable modification of asbestos fiber content.

The soybean meal or flower functions as an adhesive agent or bonding agent and is not just a filler as, for example, talc, in other compositions. The result is a material increase in the strength of the finished product and an improved retention to the surfaces to which the molding composition is applied.

Although the herein invention has been described in terms of certain preferred embodiments, it will be understood that the invention is not limited thereby and changes and modifications will be apparent to those skilled in the art without departing from the spirit and principles of this invention.

I claim:

1. In a molding compound for repair of a damaged metal surface comprising a polyester resin, an accelerator and a dry filler component, said polyester resin and accelerator comprising 40 percent by weight and said dry filler component comprising 60 percent by weight, improvement characterized by a dry filler component consisting of a substantially uniform mixture of asbestos fiber, soybean meal and metal powder, said metal powder comprising $2/12$ by weight of the filler component, said soybean meal comprising $5/12$ to $7/12$ by weight of the filler component and the balance being asbestos fiber, said soybean meal functioning as an adhesive agent and enhancing workability while minimizing dusting of the molding compound during working thereof.

2. A molding compound as in claim 1 wherein the polyester resin and accelerator are in the ratio of 3 to 1 and the dry filler component comprises $5/12$ by weight of each of soybean meal and asbestos fiber.

3. A molding compound as in claim 1 wherein the metal powder is magnesium.

References Cited

UNITED STATES PATENTS

| 2,369,502 | 2/1945 | Walker | 106—36 |
|---|---|---|---|
| 3,307,969 | 3/1967 | Quinn | 106—36 |
| 2,361,302 | 10/1944 | Little | 106—154 |

THEODORE MORRIS, Primary Examiner

U.S. Cl. X.R.

106—124, 308 P